US010027578B2

(12) United States Patent
Wood et al.

(10) Patent No.: US 10,027,578 B2
(45) Date of Patent: Jul. 17, 2018

(54) METHOD AND SYSTEM FOR ROUTABLE PREFIX QUERIES IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 15/095,946

(22) Filed: Apr. 11, 2016

(65) Prior Publication Data
US 2017/0295091 A1    Oct. 12, 2017

(51) Int. Cl.
*G06F 15/16* (2006.01)
*H04L 12/717* (2013.01)
(Continued)

(52) U.S. Cl.
CPC ........ *H04L 45/42* (2013.01); *G06F 17/30864* (2013.01); *H04L 41/024* (2013.01);
(Continued)

(58) Field of Classification Search
CPC ........................ H04L 63/0428; H04L 67/327
See application file for complete search history.

(56) References Cited

U.S. PATENT DOCUMENTS

| 817,441 A | 4/1906 | Niesz |
| 4,309,569 A | 1/1982 | Merkle |
| (Continued) | | |

FOREIGN PATENT DOCUMENTS

| DE | 1720277 A1 | 6/1967 |
| DE | 19620817 A1 | 11/1997 |
| (Continued) | | |

OTHER PUBLICATIONS

Ion et al. Toward Content-Centric Privacy in ICN: Attribute-based Encryption and Routing. ICN'13, Aug. 12, 2013, Hong Kong, China.*
(Continued)

*Primary Examiner* — Bryan Lee

(57) ABSTRACT

One embodiment provides a system that facilitates routable prefix queries in a CCN. During operation, the system generates, by a client computing device, a query for one or more indices based on a name for an interest, wherein a name is a hierarchically structured variable length identifier that includes contiguous name components ordered from a most general level to a most specific level. An index indicates a number of the contiguous name components beginning from the most general level that represent a routable prefix needed to route the interest to a content producing device that can satisfy the interest. In response to the query, the system receives the one or more indices, which allows the client computing device to determine a remaining number of name components of the interest name which can be encrypted, thereby facilitating protection of private communication in a content centric network.

16 Claims, 6 Drawing Sheets

(51) Int. Cl.
*G06F 17/30* (2006.01)
*H04L 12/24* (2006.01)
*H04L 29/06* (2006.01)
*H04L 12/725* (2013.01)
*H04L 29/08* (2006.01)

(52) U.S. Cl.
CPC ........ *H04L 45/306* (2013.01); *H04L 63/0428* (2013.01); *H04L 67/327* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,071,498 B2 | 6/2015 | Beser |
| 9,112,895 B1 | 8/2015 | Lin |
| 9,280,610 B2 | 3/2016 | Gruber |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |

(56) References Cited

U.S. PATENT DOCUMENTS

| | | |
|---|---|---|
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |

(56) References Cited

U.S. PATENT DOCUMENTS

| | | |
|---|---|---|
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108313 A1 | 4/2014 | Heidasch |

(56) References Cited

U.S. PATENT DOCUMENTS

| | | | |
|---|---|---|---|
| 2014/0108474 A1 | 4/2014 | David | |
| 2014/0115037 A1 | 4/2014 | Liu | |
| 2014/0122587 A1 | 5/2014 | Petker et al. | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0173076 A1 | 6/2014 | Ravindran | |
| 2014/0192717 A1 | 7/2014 | Liu | |
| 2014/0195328 A1 | 7/2014 | Ferens | |
| 2014/0195641 A1 | 7/2014 | Wang | |
| 2014/0195666 A1 | 7/2014 | Dumitriu | |
| 2014/0214942 A1 | 7/2014 | Ozonat | |
| 2014/0233575 A1 | 8/2014 | Xie | |
| 2014/0237085 A1 | 8/2014 | Park | |
| 2014/0237095 A1 | 8/2014 | Bevilacqua-Linn | |
| 2014/0245359 A1 | 8/2014 | DeFoy | |
| 2014/0254595 A1 | 9/2014 | Luo | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0298248 A1 | 10/2014 | Kang | |
| 2014/0314093 A1 | 10/2014 | You | |
| 2014/0337276 A1 | 11/2014 | Iordanov | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0039890 A1 | 2/2015 | Khosravi | |
| 2015/0063802 A1 | 3/2015 | Bahadur | |
| 2015/0089081 A1 | 3/2015 | Thubert | |
| 2015/0095481 A1 | 4/2015 | Ohnishi | |
| 2015/0095514 A1 | 4/2015 | Yu | |
| 2015/0169758 A1 | 6/2015 | Assom | |
| 2015/0188770 A1 | 7/2015 | Naiksatam | |
| 2015/0195149 A1 | 7/2015 | Vasseur | |
| 2015/0207633 A1 | 7/2015 | Ravindran | |
| 2015/0207864 A1 | 7/2015 | Wilson | |
| 2015/0222424 A1 | 8/2015 | Mosko | |
| 2015/0279348 A1 | 10/2015 | Cao | |
| 2017/0012867 A1* | 1/2017 | Royon | H04L 45/42 |
| 2017/0149747 A1* | 5/2017 | Wood | H04L 63/0435 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Ion et al. Design and Implementation of a Confidentiality and Access Control Solution for Publish/Subscribe Systems. Apr. 19, 2011.*
Wood et al. Flexible End-to-End Content Security in CCN. 978-1-4799-2355-7/14 2014 IEEE.*
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc. downloaded Apr. 27, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Science vol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/ www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.

(56) References Cited

OTHER PUBLICATIONS

"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_JM. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.

(56) References Cited

OTHER PUBLICATIONS

J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

(56) References Cited

OTHER PUBLICATIONS

Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
C. Gentry and A. Silverberg. Hierarchical ID-Based Cryptography. Advances in Cryptology—ASIACRYPT 2002. Springer Berlin Heidelberg (2002).
Zahariadis, Theodore, et al. "Trust management in wireless sensor networks." European Transactions on Telecommunications 21.4 (2010): 386-395.
Mahadevan, Priya, et al. "Systematic topology analysis and generation using degree correlations." ACM SIGCOMM Computer Communication Review. vol. 36. No. 4. ACM, 2006.
Xiong et al., "CloudSeal: End-to-End Content Protection in Cloud-based Storage and Delivery Services", 2012.
https://code.google.com/p/ccnx-trace/.
Biradar et al., "Review of multicast routing mechanisms in mobile ad hoc networks", Aug. 16, Journal of Network and Computer Applications 35 (2012) 221-229.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
International Search Report and Written Opinion in counterpart International Application No. PCT/US2017/023881, dated Jun. 29, 2017, 11 pages.

\* cited by examiner

METHOD AND SYSTEM FOR ROUTABLE PREFIX QUERIES IN A CONTENT CENTRIC NETWORK

RELATED APPLICATIONS

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");
- U.S. patent application Ser. No. 14/927,034, entitled "SYSTEM FOR KEY EXCHANGE IN A CONTENT CENTRIC NETWORK," by inventors Christopher A. Wood, Marc E. Mosko, and Ersin Uzun, filed 29 Oct. 2015 (hereinafter "U.S. patent application Ser. No. 14/927,034"); and
- U.S. patent application Ser. No. 15/056,904, entitled "METHOD AND SYSTEM FOR NAME ENCRYPTION AGREEMENT IN A CONTENT CENTRIC NETWORK," by inventors Christopher A. Wood and Glenn C. Scott, filed 29 Feb. 2016 (hereinafter "U.S. patent application Ser. No. 15/056,904");

the disclosures of which are herein incorporated by reference in their entirety.

BACKGROUND

Field

This disclosure is generally related to distribution of digital content. More specifically, this disclosure is related to a method and system for providing an extension to CCN routing protocols that enables a consumer to generate routable prefix queries and determine the minimum number of cleartext name components necessary for an interest to reach a producer in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN data packet (such as an interest or content object) is routed based on its name. Some name components may be used by an intermediate node to route a CCN interest, while other name components may be used by a content producer to satisfy a request based on private user information or application-specific data. In the latter case, the meaningfulness of the name components may reveal information regarding the requested content and may result in a breach of user privacy or security. A consumer may encrypt the interest name, but a sufficient number of name components must remain unencrypted for routing purposes. This "minimum routable prefix" is the maximal name length (e.g., maximum number of name components) needed to route an interest to a content producer who can satisfy the content request.

While a CCN brings many desired features to a network, some issues remain unsolved for a consumer in determining, via an existing CCN routing protocol, the minimum routable prefix for an interest name.

SUMMARY

One embodiment provides a system that facilitates routable prefix queries in a CCN. During operation, the system generates, by a client computing device, a query for one or more indices based on a name for an interest, wherein a name is a hierarchically structured variable length identifier that includes contiguous name components ordered from a most general level to a most specific level. An index indicates a number of the contiguous name components beginning from the most general level that represent a routable prefix needed to route the interest to a content producing device that can satisfy the interest. In response to the query, the system receives the one or more indices, which allows the client computing device to determine a remaining number of name components of the interest name which can be encrypted, thereby facilitating protection of private communication in a content centric network.

In some embodiments, the system generates a first interest with a name that includes a first routable prefix that corresponds to a received index, wherein the first routable prefix is in cleartext. The system encrypts a remaining suffix which comprises name components of the name immediately following the first routable prefix.

In some embodiments, the system transmits the first interest to a first content producing device based on the first routable prefix, wherein the first interest is an initial interest in a key exchange protocol between the client computing device and the first content producing device.

In some embodiments, the query is generated by a first local application. The system transmits the query to a second local application that is a local routing service that shares a same forwarder as the first local application, and the local routing service configures a forwarding information base of the client computing device based on notification messages received from content producing devices.

In some embodiments, the local routing service communicates with other network entities via a portal instance associated with the second local application.

In some embodiments, the local routing service determines the one or more indices by communicating via the local forwarder with other network entities based on one or more of: a name based protocol; a route-based protocol; and an explicit negotiation protocol.

In some embodiments, the second local application provides an interface to the first local application, wherein the interface allows the first local application to transmit the query based on the interest name.

In some embodiments, a remote application on a first content producing device publishes a notification message indicating that the first content producing device can serve content for a routable prefix that corresponds to a received index.

In some embodiments, in response to receiving a notification message from a first content producing device indicating that the first content producing device can serve content for a routable prefix that corresponds to a received index, the system configures a forwarding information base of the client computing device based on the notification message.

Another embodiment facilitates routable prefix queries in a CCN. During operation, the system transmits, by a content producing device, a notification message indicating that the content producing device can serve content for a name prefix, wherein a name is a hierarchically structured variable length identifier that includes contiguous name components ordered from a most general level to a most specific level. A name prefix indicates one or more contiguous name components beginning from the most general level. The notification message is transmitted by a local routing service via a forwarder of the content producing device, thereby facilitating protection of private communication in a content centric network.

In some embodiments, transmitting the notification message causes a client computing device or an intermediate node to, in response to receiving the notification message, configure a forwarding information base of the client computing device or the intermediate node based on the notification message.

BRIEF DESCRIPTION OF THE FIGURES

In the figures, like reference numerals refer to the same figure elements.

DETAILED DESCRIPTION

Figure 1A:
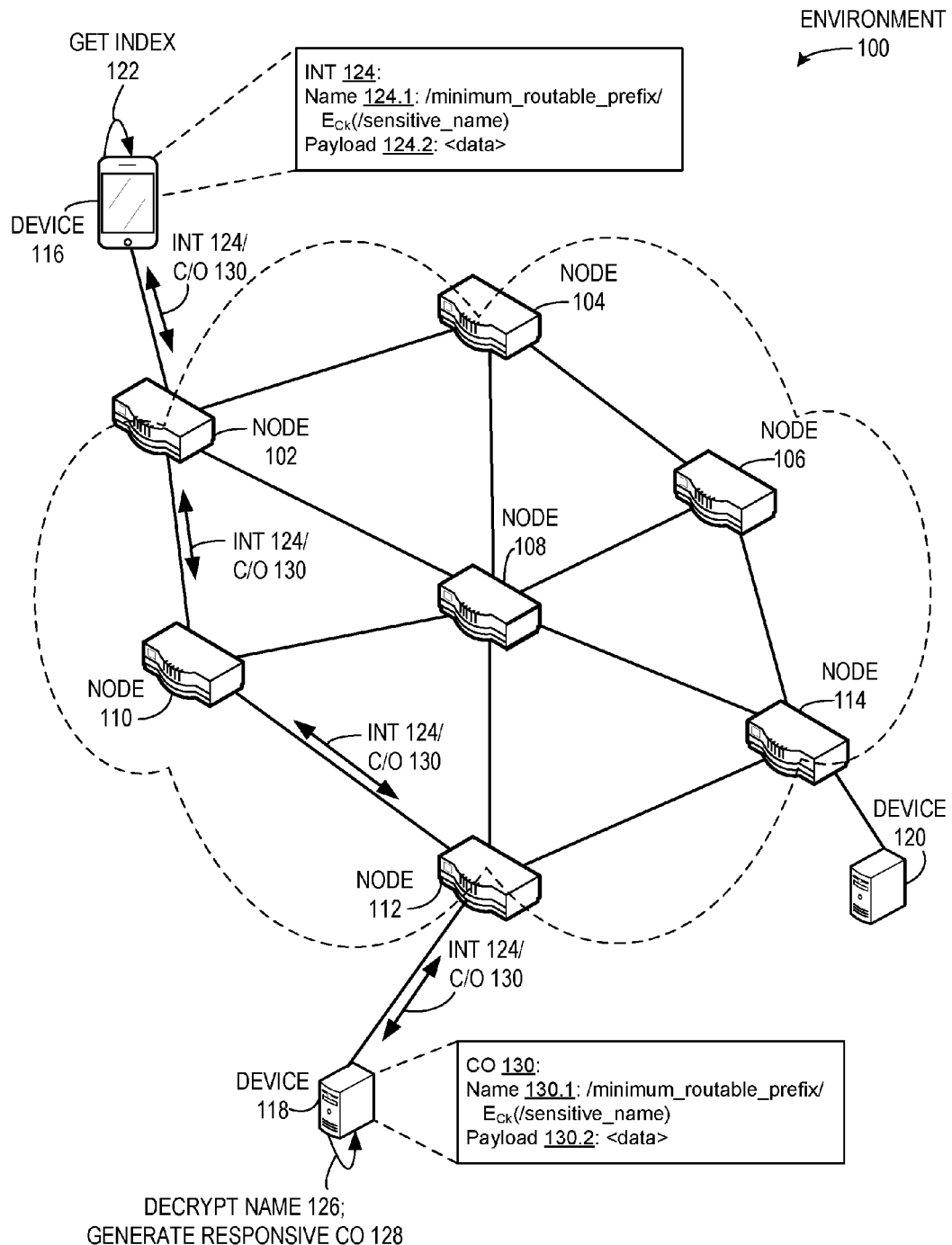
FIG. 1A illustrates an exemplary environment which facilitates routable prefix queries in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of enabling a consumer to determine the minimal number of cleartext name components needed to route interests from a consumer to an authoritative producer. A CCN data packet (e.g., an interest or a content object) is routed based on its name, which can include multiple name components. Some of the name components may be used for routing purposes, while other name components may contain sensitive user information or application-specific data. A consumer may encrypt the interest name, but a sufficient number of name components must remain unencrypted in order for the interest to be routed to a producer that can satisfy the interest or serve the requested content. Embodiments of the present system allow a consumer to determine this sufficient number of unencrypted name components, which is also known as the minimum routable prefix. The minimum routable prefix can correspond to an index "i" in the CCN name, where the index i indicates the position of a particular name component in the hierarchically structured variable length identifier that includes contiguous name components ordered from a most general level to a most specific level.

A CCN node (e.g., a consumer, a forwarder, or a producer) with a local forwarder can have a dynamically managed FIB. In embodiments of the present invention, such a node can also use a local routing service to configure its FIB. Other local applications using the same local forwarder may also use the local routing service. The local routing service can provide an interface that enables a client or a consumer (e.g., a client computing device) to request the routable prefix for a given name. For example, a consumer can discover the index that corresponds to the minimum routable prefix for an interest name "/a/b/c/d." The consumer can send a query via the interface to the local routing service. The query can return an index (also referred to as a "split index") i, which indicates the minimum routable prefix needed to route the interest to a producer that can satisfy the interest and serve the requested content. If multiple qualified producers are available for the given interest name, the function can return a list of split indices in increasing order. For example, assume that a first producer application can serve content under the "/a/b" prefix. A second producer application may subsequently create and begin serving content under the "/a/b/c" prefix. The second application subsumes the first application based on the longest prefix matching performed in the FIB. Thus, a query for the routable prefix of a name "/a/b/file1" returns i=1, whereas a query for the routable prefix of a name "a/b/c/object2" returns i=[1,2].

The local routing service can determine the split index (or indices) based on a name-based negotiation protocol, a route-based negotiation protocol, or an explicit negotiation protocol, as described in U.S. patent application Ser. No. 15/056,904. Upon receiving the response to the query (i.e., the split index or indices), the requesting consumer can generate and transmit interests with names that include the routable prefix that corresponds to a respective index, and encrypt the remaining name components (e.g., the suffix) of the name. In addition, the consumer may transmit such an interest as an initial interest in a key exchange protocol, as described in U.S. patent application Ser. No. 14/927,034.

Thus, the system facilitates routable prefix queries in a CCN by allowing a consumer to use the existing CCN routing protocol to discover the minimum routable prefix (or prefixes) for an interest, which indicates a maximum number of name components needed to route the interest to a producer. A minimum routable prefix also indicates the index at which the consumer may begin encrypting the name.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary environment 100 which facilitates routable prefix queries in a content centric network, in accordance with an embodiment of the present invention. A network 100 can include a consumer or content requesting device 116, producers or content producing devices 118 and 120, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

For a name N with p name components, let $N=[n_1, n_2, \ldots n_p]$, where N can be represented as "/$n_1$/$n_2$/ . . . /$n_p$," and where an index q corresponds to the name component at the qth position of the name, where q is from 1 top. In some embodiments, the index q is from zero to p−1. During operation, consumer or client computing device 116 can determine, for a name N of "/a/b/c/d/x/y/z," an index "i" at which device 116 may begin encrypting the name N (get index function 122, described in detail below in relation to FIG. 2). This index may be referred to as the "split index." A split index i with a value of "4" can indicate both the "minimum_routable_prefix" as well as the remainder of the name N as the "sensitive_name" that can be encrypted. In other words, the split index can indicate the name prefix of the name N through the name component whose position index is equal to "4" (e.g., "a/b/c/d"), and can also indicate the name components following the name component whose position index is equal to 4 that can be encrypted (e.g., "/x/y/z"). Device 116 can generate an interest 124 with a name 124.1 of "/minimum_routable_prefix/$E_{Ck}$(/sensitive_name)," where "Ck" is the public key of consumer or device 116. Interest 124 can also include an optional payload 124.2 with a value of "<data>."

Interest 124 can travel through network 100 via nodes 102, 110, and 112, before reaching producer or content producing device 118. Device 118 can serve content or satisfy requests for content with the prefix of "/a/b/c/d" or "minimum_routable_prefix." Assume that device 118 is in possession of or has a way to retrieve the public key of device 116. Device 118 can decrypt the encrypted portion of name 124.1 of interest 124 (function 126), and generate a content object 130 corresponding to the name "/minimum_routable_prefix/sensitive_data" (function 128). Device 118 can replace a name 130.1 in content object 130 with the original partially encrypted name (e.g., name 130.1 with a value of "/minimum_routable_prefix/$E_{Ck}$(/sensitive_name)"), and transmit content object 130 to device 118 on a reverse path (e.g., via nodes 112, 110, and 102).

Figure 1B:
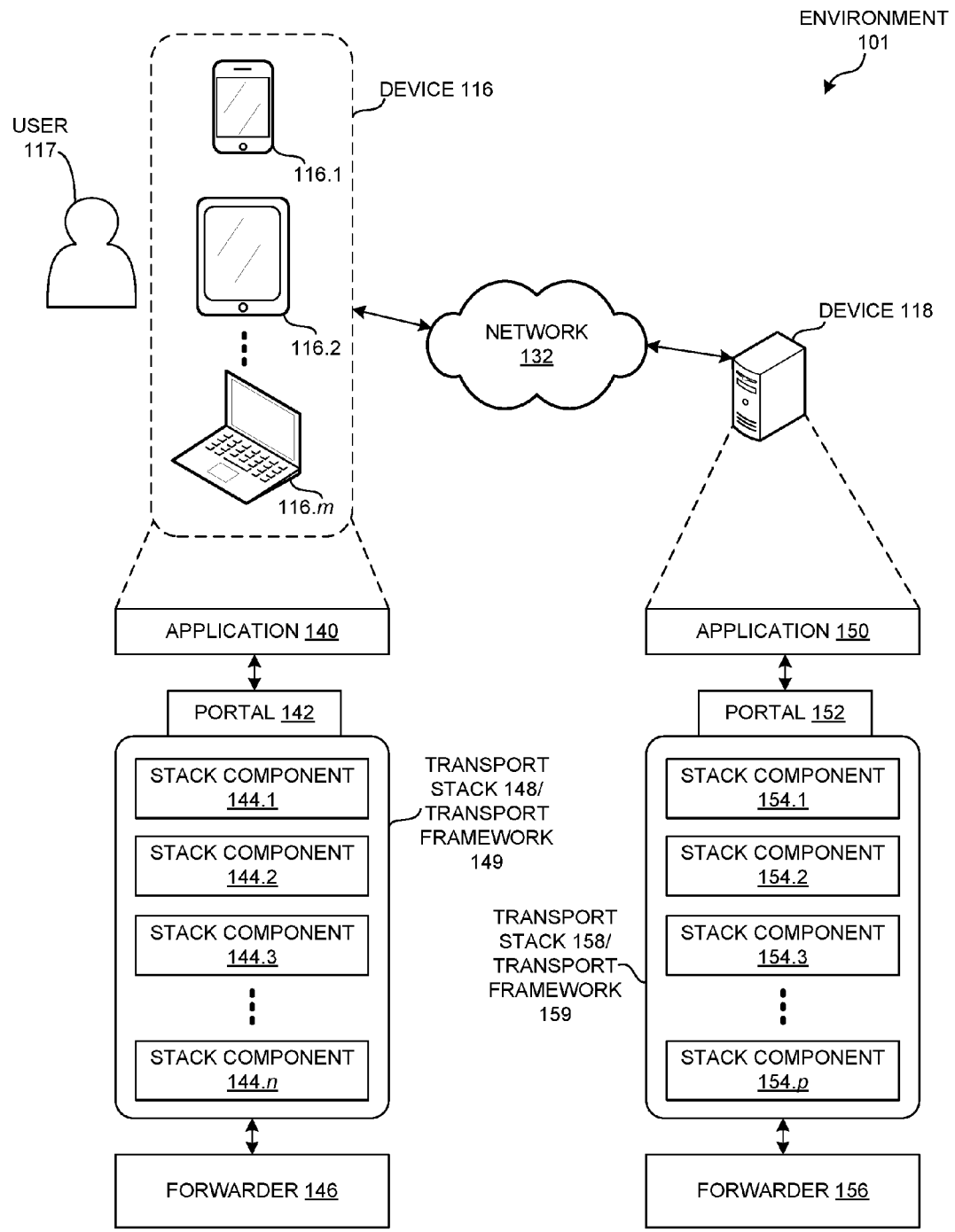
FIG. 1B illustrates an exemplary environment which facilitates routable prefix queries in a content centric network, in accordance with an embodiment of the present invention.

FIG. 1B illustrates an exemplary environment 101 which facilitates routable prefix queries in a content centric network, in accordance with an embodiment of the present invention. The entities in FIG. 1B correspond to the entities in FIG. 1A. Computing environment 100 can include a computer network 132, such as a CCN. Environment 100 can also include a user 117 associated with local computing device 116, and remote computing device 118. Devices 116 and 118 can have internal transport stacks (e.g., associated with transport frameworks 149 and 159, respectively) that exchange network packets with each other over network 132.

In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, device 116 of the present invention does not use a conventional "stack." Rather, device 116 via an application 140 can request a portal API instance corresponding to a portal 142 which corresponds to transport framework 149. Similarly, device 118 via an application 150 can request a portal API instance corresponding to a portal 152 which corresponds to transport framework 159. Applications 140 and 150 can generate requests to retrieve or create the portal API instances associated with portals 142 and 152, respectively. Alternatively, the portal API instances can be created by a root user associated with device 116 or device 118.

Device 116 can include any computing device coupled to network 132, such as a smartphone 116.1, a tablet computer 116.2, and/or a server or personal computer 116.*m*. Specifically, device 116 can include application 140 which communicates via portal 142 with transport framework 149, which includes transport stack 148. Note that while transport framework 149 is depicted as including only a single transport stack (i.e., transport stack 148), a transport framework can include multiple transport stacks. Transport stack 148 can include stack components 144.1-144.*n*. Device 116 can also include a local forwarder 146 (e.g., a network interface card, or a router in a local area network) which can transfer packets between a stack (and individual stack components) of transport framework 149 and network 132. Similarly, device 118 can include any computing device coupled to network 132, such as a server or an end host device. Device 118 can include application 150 which communicates via portal 152 with transport framework 159, which includes transport stack 158. Transport stack 158 can include stack components 154.1-154.*p*. Device 118 can also include a forwarder 156 which can transfer packets between a stack (and individual stack components) of transport framework 159 and network 132. Forwarders 146 and 156 can also facilitate the transfer of packets directly between individual stack components 144.1-144.*n* and 154.1-154.*p*, respectively.

A local forwarder on a single device can service multiple applications and corresponding transport stacks. For example, an end-host with a local forwarder can use a local routing service (e.g., a local application) to publish namespace prefixes to the rest of the network using the corresponding routing protocol. In addition, a consumer with a local forwarder can query its local routing service (e.g., a local application) for the split index or indices that indicate the corresponding routable prefixes for a given interest name.

Figure 2:
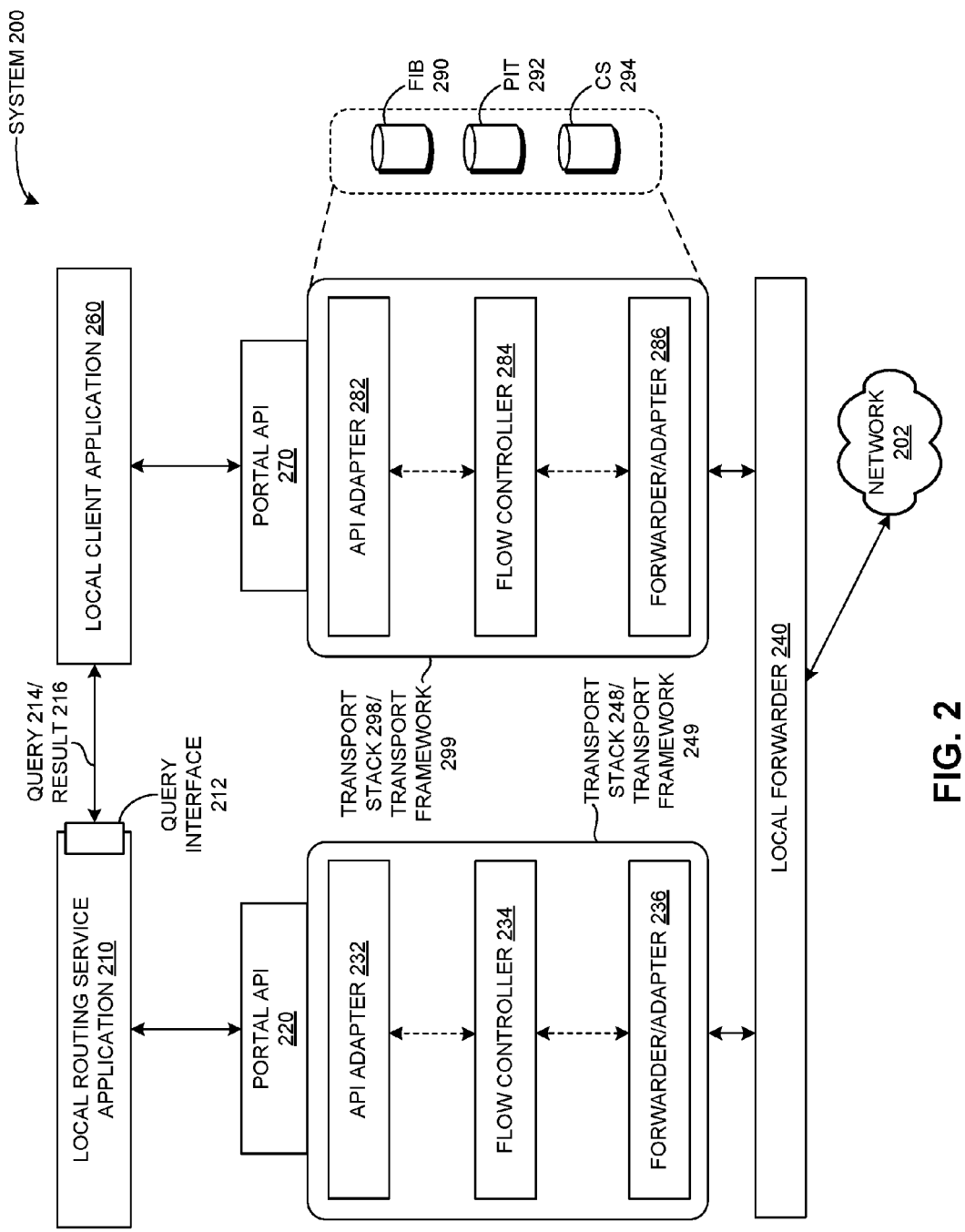
FIG. 2 illustrates an exemplary system which facilitates routable prefix queries in a content centric network, in accordance with an embodiment of the present invention.

FIG. 2 illustrates an exemplary system 200 which facilitates routable prefix queries in a content centric network, in accordance with an embodiment of the present invention. System 200 can include two applications residing on a same computing device (e.g., device 116 or 118 as described in relation to FIG. 1A). A local client application 260 and a local routing service application 210 can each instantiate a CCN portal API for a corresponding transport stack, which uses a same local forwarder 240.

Local client application 260 can instantiate a portal API 270 for a transport stack 298 of a transport framework 299. Transport framework 299 can include one or more transport stacks which each include multiple stack components or communication modules. In FIG. 2, transport framework 299 depicts one transport stack (e.g., transport stack 298) which includes stack components 282, 284, and 286. An API adapter 282 can communicate between an API and a specific transport stack of transport framework 299. A flow controller 284 can shape and manage traffic, pipeline and transmit interests, and order content objects. A forwarder/adapter 286 can communicate with local forwarder 240. Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning). Forwarder 240 can communicate with other forwarders over network 202. In addition, local client application 260 or transport framework 299 can access a FIB 290, a PIT 292, and a CS 294 for CCN-related purposes, as described in U.S. patent application Ser. Nos. 13/847,814 and 12/338,175.

Similarly, local routing service application 210 can instantiate a portal API 220 for a transport stack 248 of a transport framework 249. Transport framework 249 can include one or more transport stacks which each include multiple stack components or communication modules. In FIG. 2, transport framework 249 depicts one transport stack (e.g., transport stack 248) which includes the following stack components: an API adapter 232; a flow controller 234; and a forwarder/adapter 236. In addition, local routing service application 210 provides a query interface 212 to other local applications, e.g., to local client application 260. In some embodiments, applications 210 and 260 communicate based on an interprocess communication protocol ("IPC"). In addition, local routing service application 210, local client application 260, and transport frameworks 298 and 248 can access (e.g., perform lookups) and dynamically configure FIB 290 based on notification messages or other information received based on a routing protocol.

During operation, local client application 260 can generate a query 214 for one or more indices based on a given name (e.g., a name for an interest). In response to query 214, local routing service application 210 can determine the appropriate index or indices for the given name, and transmit a result 216 to local client application 260. As discussed above, local routing service application can determine the appropriate index or indices for a given name based on the protocols described in U.S. patent application Ser. No. 15/056,904. For example, client application 260 can generate query 214 based on the name N of "/a/b/c/d/x/y/z." In response to query 214, local routing service application 210 can determine that the split indices for the name N are i=[1,4]. This can be based on previously received notification messages which indicate that a first producer can serve content for name prefix "/a" and that a second producer can serve content for name prefix "/a/b/c/d." The split index can indicate the routable name prefix of the name N, that is, the name components from the first name component through the name component whose position index is equal to "1" or "4" (e.g., respectively, "/a" or "/a/b/c/d"). The split index can also indicate the name components following the name component whose position index is equal to "1" or "4" that can be encrypted (e.g., respectively, "/b/c/d/x/y/z" or "/x/y/z").

Thus, system 200 allows a local application to determine the minimum number of cleartext name components necessary to route an interest from the local client computing device to a producer that can satisfy the interest. System 200 also accounts for multiple authoritative producers by returning one or more split indices that correspond to the routable prefixes necessary to route an interest.

Content Producing Device Facilitates Routable Prefix Queries

Figure 3:
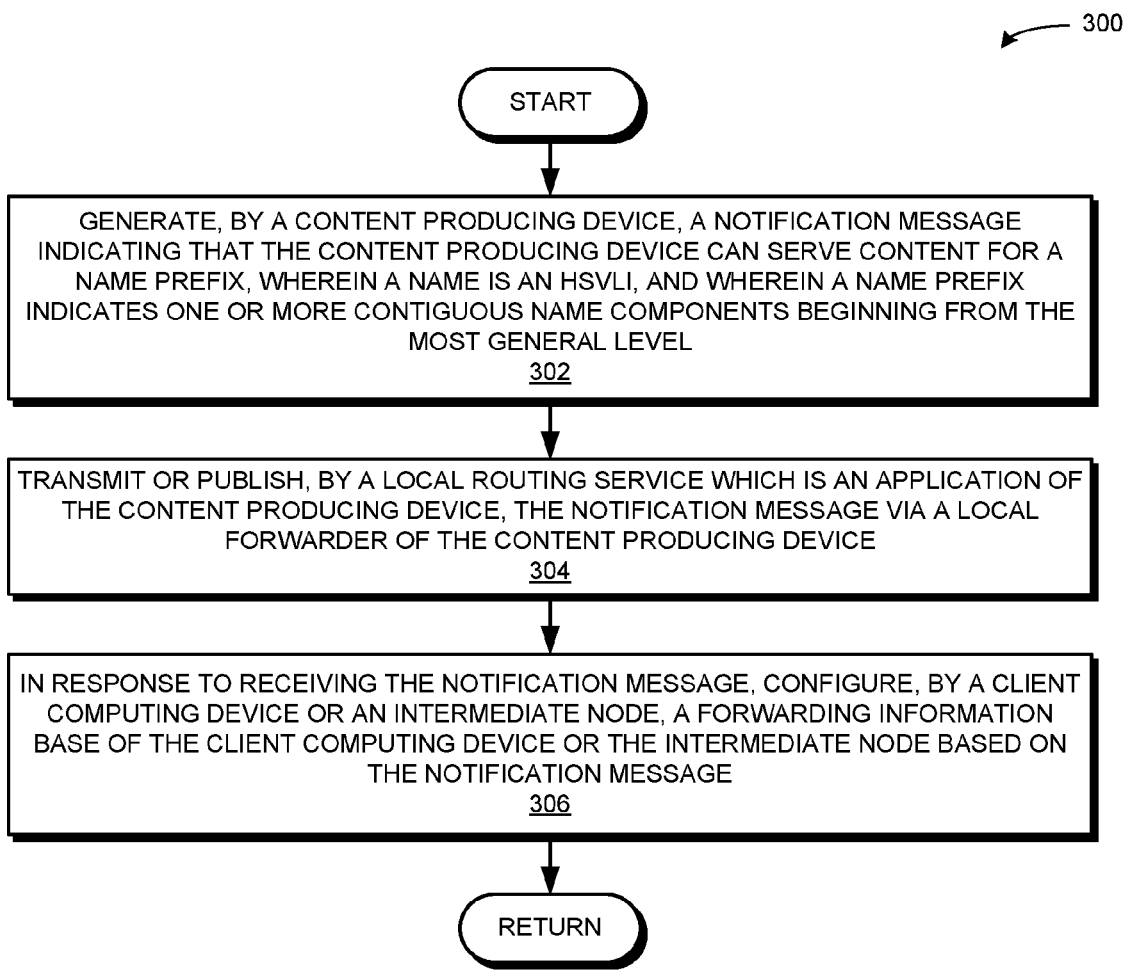
FIG. 3 presents a flow chart illustrating a method by a content producing device for facilitating routable prefix queries in a content centric network, in accordance with an embodiment of the present invention.

FIG. 3 presents a flow chart 300 illustrating a method by a content producing device for facilitating routable prefix queries in a content centric network, in accordance with an embodiment of the present invention. During operation, the system generates, by a content producing device, a notification message indicating that the content producing device can serve content for a name prefix, wherein a name is an HSVLI, and wherein a name prefix indicates one or more contiguous name components beginning from the most general level (operation 302). The system transmits or publishes, by a local routing service that is an application of the content producing device, the notification message via a local forwarder of the content producing device (operation 304). The notification message can be received by a client computing device or an intermediate node, router, or other forwarding device. In response to receiving the notification message, a client computing device or an intermediate node can configure a forwarding information base (FIB) of the client computing device or the intermediate node based on the notification message (operation 306). For example, a content producer can publish a notification message that indicates that it can serve content for the name prefix "/a/b." An intermediate node can receive the notification message and configures its local FIB by adding an entry for the name prefix "/a/b" and a corresponding outgoing interface for that content producer (or a next-hop node that corresponds to that content producer).

Client Computing Device Facilitates Routable Prefix Queries

Figure 4:
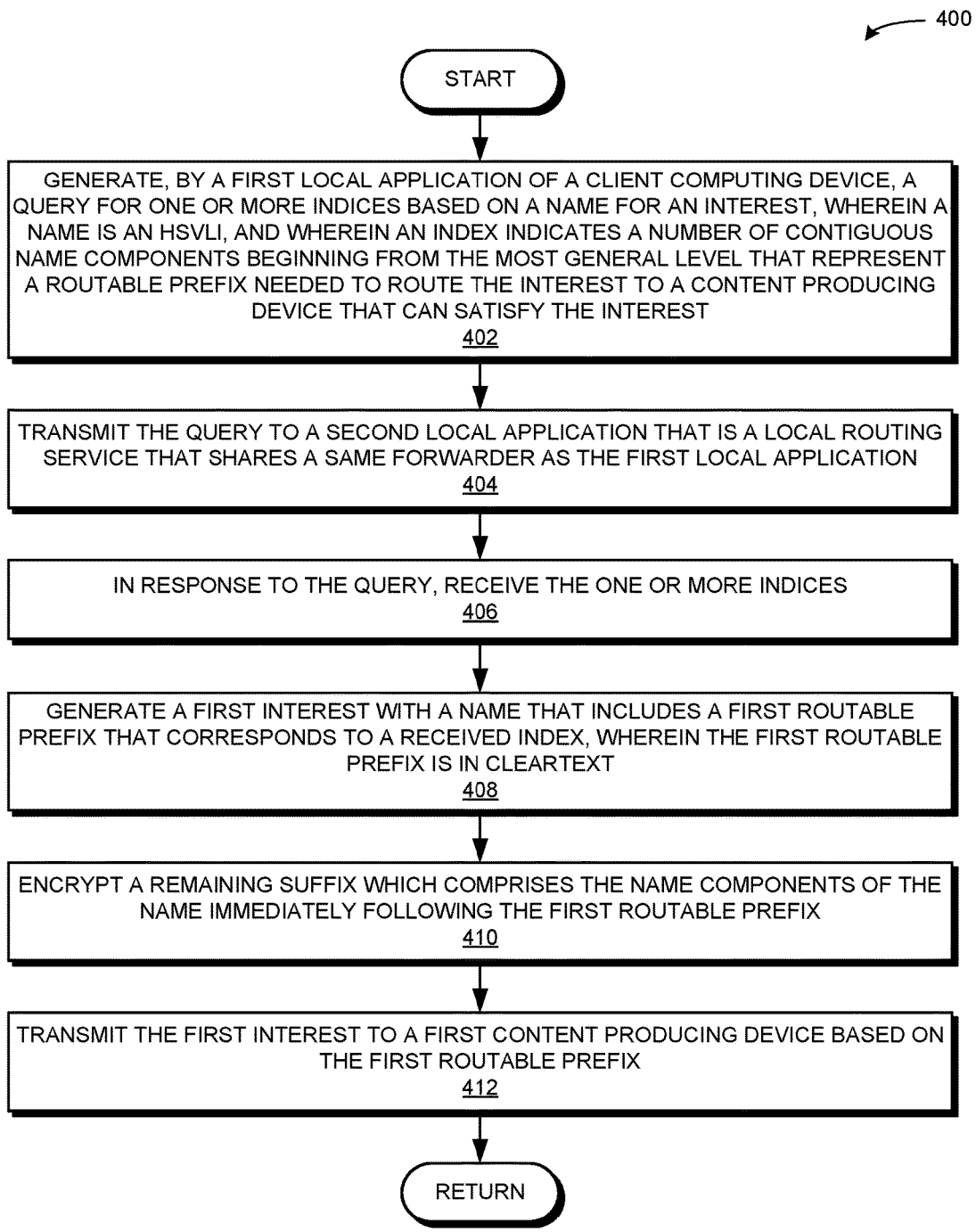
FIG. 4 presents a flow chart illustrating a method by a client computing device for facilitating routable prefix queries in a content centric network, in accordance with an embodiment of the present invention.

FIG. 4 presents a flow chart 400 illustrating a method by a client computing device for facilitating routable prefix queries in a content centric network, in accordance with an embodiment of the present invention. During operation, the system generates, by a first local application of a client computing device, a query for one or more indices based on a name for an interest, wherein a name is an HSVLI, and wherein an index indicates a number of contiguous name components beginning from the most general level that represent a routable prefix needed to route the interest to a content producing device that can satisfy the interest (operation 402). The first local application transmits the query to a second local application that is a local routing service that shares a same forwarder as the first local application (operation 404).

The local routing service can configure a local FIB of the client computing device based on notification messages received from content producing devices. The local routing service can communicate with other network entities via a CCN portal API instance associated with second local application (e.g., the local routing service). The local routing service can determine the indices based on protocols as described in U.S. patent application Ser. No. 15/056,904. The local routing service can provide an interface to the first local application which allows the first local application to transmit the routable prefix query based on the interest name.

In response to the query, the client computing device receives the one or more indices (operation 406). The client computing device generates a first interest with a name that includes a first routable prefix that corresponds to a received index, wherein the first routable prefix is in clear text (operation 408). The client computing device encrypts a remaining suffix which comprises the name components of the name immediately following the first routable prefix (operation 410). Subsequently, the client computing device transmits the first interest to a first content producing device based on the first routable prefix (operation 412). In some embodiments, the first interest can be an initial interest in a key exchange protocol between the client computing device and the first content producing device, as described in U.S. patent application Ser. No. 14/927,034.

Exemplary Computer System

Figure 5:
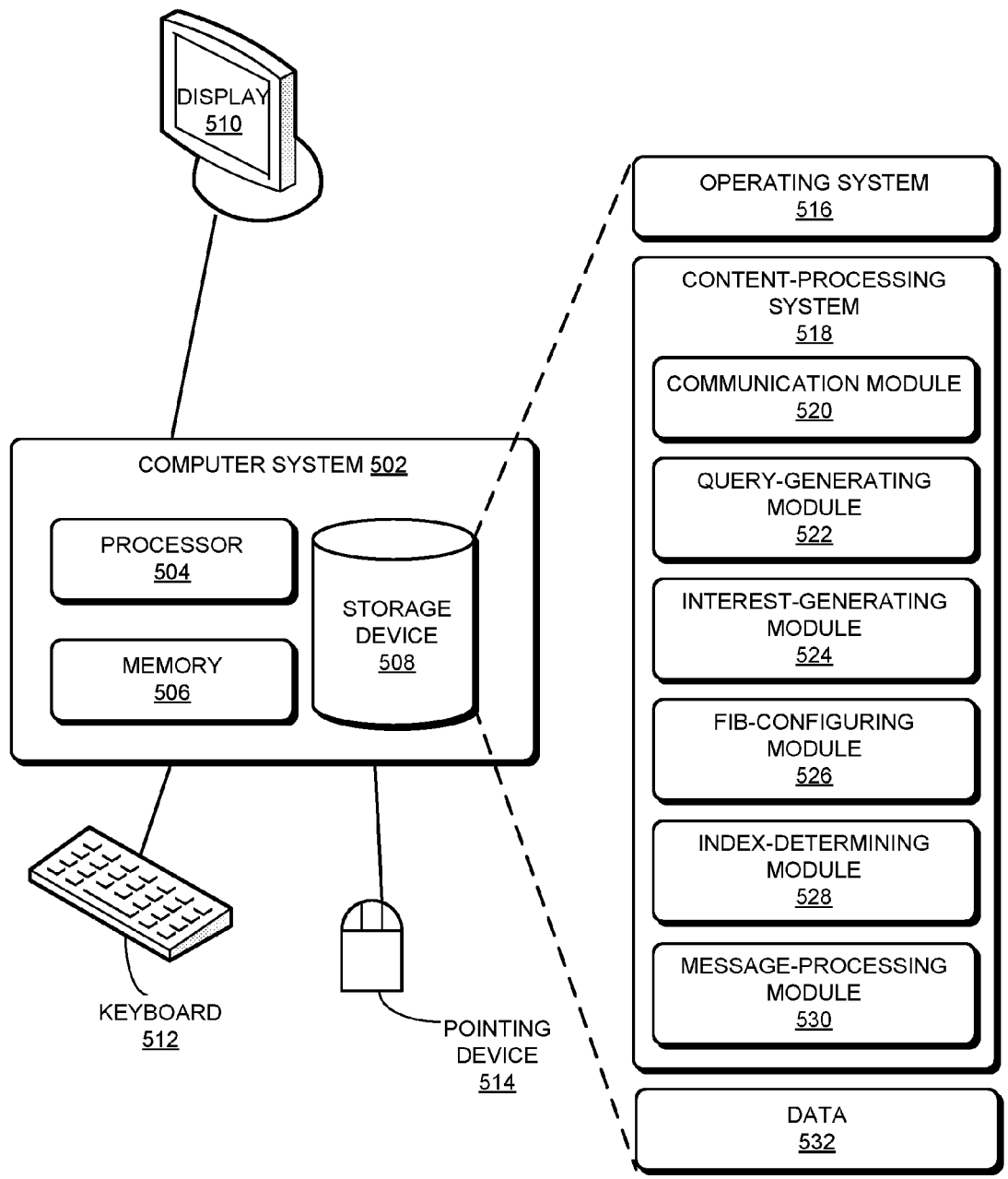
FIG. 5 illustrates an exemplary computer system that facilitates routable prefix queries in a content centric network, in accordance with an embodiment of the present invention.

FIG. 5 illustrates an exemplary computer system 500 that facilitates routable prefix queries in a content centric network, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 530.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network (communication module 520). A data packet can include a query. A data packet can also include an interest packet or a content object packet with a name which is an HSVLI that includes contiguous name components ordered from a most general level to a most specific level.

Further, content-processing system 518 can include instructions for generating, by a client computing device, a query for one or more indices based on a name for an interest, wherein a name is a hierarchically structured variable length identifier that includes contiguous name components ordered from a most general level to a most specific level (query-generating module 522). Content-processing system 518 can also include instructions for, in response to the query, receiving the one or more indices (communication module 520).

Content-processing system 518 can also include instructions for generating a first interest with a name that includes a first routable prefix that corresponds to a received index, wherein the first routable prefix is in cleartext, and for encrypting a remaining suffix which comprises name components of the name immediately following the first routable prefix (interest-generating module 524). Content-processing system 518 can include instructions for transmitting the first interest to a first content producing device based on the first routable prefix, wherein the first interest is an initial interest in a key exchange protocol between the client computing device and the first content producing device (communication module 520).

Content-processing system 518 can additionally include instructions for, when the query is generated by a first local application, transmitting the query to a second local application that is a local routing service that shares a same forwarder as the first local application (communication module 520). Content-processing system 518 can include instructions for configuring, by the local routing service, a forwarding information base of the client computing device based on notification messages received from content producing devices (FIB-configuring module 526). Content-processing system 518 can also include instructions for communicating, by the local routing service, with other network entities via a portal instance associated with the second local application (communication module 520). Content-processing system 518 can include instructions for determining, by the local routing service, the one or more indices by communicating via the local forwarder with other network entities based on one or more of: a name based protocol; a route-based protocol; and an explicit negotiation protocol (index-determining module 528).

Content-processing system 518 can also include instructions for providing, by the second local application, an interface to the first local application, wherein the interface allows the first local application to transmit the query based on the interest name (communication module 520). Content-processing system 518 can also include instructions for publishing, by a remote application on a first content producing device, a notification message indicating that the first content producing device can serve content for a routable prefix that corresponds to a received index (message-processing module 530). Content-processing system 518 can also include instructions for, in response to receiving a notification message from a first content producing device indicating that the first content producing device can serve content for a routable prefix that corresponds to a received index, configuring a forwarding information base of the client computing device based on the notification message (FIB-configuring module 526).

Content-processing system 518 can further include instructions for transmitting, by a content producing device, a notification message indicating that the content producing device can serve content for a name prefix (communication module 520). Content-processing system 518 can include instructions for, in response to the notification message, configuring, by a client computing device or an intermediate node, a forwarding information base of the client computing device or the intermediate node based on the notification message (FIB-configuring module 526).

Data 532 can include any data that is required as input or that is generated as output by the methods and/or processes described in this disclosure. Specifically, data 532 can store at least: a query; an interest; a content object; a name; a name that is an HSVLI that includes contiguous name components ordered from a most general level to a most specific level; an index which indicates a number of the contiguous name components beginning from the most general level that represent a routable prefix needed to route the interest to a content producing device that can satisfy the interest; an index that corresponds to a position of a name component in the HSVLI; an index which is a split index that indicates a minimum routable prefix; a routable prefix or a name prefix that indicates one or more contiguous name components beginning from the most general level; one or more encrypted name components; an interest name with a routable prefix in cleartext followed by a suffix that is encrypted; an initial interest in a key exchange protocol; a first local application; a second local application that is a local routing service; a local forwarder; a notification message; a FIB; a PIT; a CS; and a portal instance.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating routable prefix queries, the system comprising: a processor; and a storage device storing instructions that when executed by the processor cause the processor to perform a method, the method comprising: generating, by a client computing device, a query for one or more indices based on a name for an interest, wherein a name is a hierarchically structured variable length identifier that includes contiguous name components ordered from a most general level to a most specific level, wherein an index indicates a number of the contiguous name components beginning from the most general level that represent a routable prefix needed to route the interest to a content producing device that can satisfy the interest; and in response to the query, receiving the one or more indices, which allows the client computing device to determine a remaining number of name components of the interest name which can be encrypted, thereby facilitating protection of private communication in a content centric network, wherein the method further comprises: generating a first interest with a name that includes a first routable prefix that corresponds to a received index, wherein the first routable prefix is in cleartext; and encrypting a remaining suffix which comprises name components of the name immediately following the first routable prefix.

2. The computer system of claim 1, wherein the method further comprises: transmitting the first interest to a first content producing device based on the first routable prefix, wherein the first interest is an initial interest in a key exchange protocol between the client computing device and the first content producing device.

3. The computer system of claim 1, wherein the query is generated by a first local application, and wherein the method further comprises: transmitting the query to a second local application that is a local routing service that shares a same forwarder as the first local application, wherein the local routing service configures a forwarding information base of the client computing device based on notification messages received from content producing devices.

4. The computer system of claim 3, wherein the local routing service communicates with other network entities via a portal instance associated with the second local application.

5. The computer system of claim 3, wherein the local routing service determines the one or more indices by communicating via the local forwarder with other network entities based on one or more of: a name based protocol; a route-based protocol; and an explicit negotiation protocol.

6. The computer system of claim 3, wherein the second local application provides an interface to the first local application, wherein the interface allows the first local application to transmit the query based on the interest name.

7. The computer system of claim 1, wherein a remote application on a first content producing device publishes a notification message indicating that the first content producing device can serve content for a routable prefix that corresponds to a received index.

8. The computer system of claim 1, wherein the method further comprises: in response to receiving a notification message from a first content producing device indicating that the first content producing device can serve content for a routable prefix that corresponds to a received index, configuring a forwarding information base of the client computing device based on the notification message.

9. A method for facilitating routable prefix queries, the method comprising: generating, by a client computing device, a query for one or more indices based on a name for an interest, wherein a name is a hierarchically structured variable length identifier that includes contiguous name components ordered from a most general level to a most specific level, wherein an index indicates a number of the contiguous name components beginning from the most general level that represent a routable prefix needed to route the interest to a content producing device that can satisfy the interest; and in response to the query, receiving the one or more indices, which allows the client computing device to determine a remaining number of name components of the interest name which can be encrypted, thereby facilitating protection of private communication in a content centric network, further comprising: generating a first interest with a name that includes a first routable prefix that corresponds to a received index, wherein the first routable prefix is in cleartext; and encrypting a remaining suffix which comprises name components of the name immediately following the first routable prefix.

10. The method of claim 9, further comprising: transmitting the first interest to a first content producing device based on the first routable prefix, wherein the first interest is an initial interest in a key exchange protocol between the client computing device and the first content producing device.

11. The method of claim 9, wherein the query is generated by a first local application, and wherein the method further comprises: transmitting the query to a second local application that is a local routing service that shares a same forwarder as the first local application, wherein the local routing service configures a forwarding information base of the client computing device based on notification messages received from content producing devices.

12. The method of claim 11, wherein the local routing service communicates with other network entities via a portal instance associated with the second local application.

13. The method of claim 11, wherein the local routing service determines the one or more indices by communicating via the local forwarder with other network entities based on one or more of: a name based protocol; a route-based protocol; and an explicit negotiation protocol.

14. The method of claim 11, wherein the second local application provides an interface to the first local application, wherein the interface allows the first local application to transmit the query based on the interest name.

15. The method of claim 9, wherein a remote application on a first content producing device publishes a notification message indicating that the first content producing device can serve content for a routable prefix that corresponds to a received index.

16. The method of claim 9, further comprising: in response to receiving a notification message from a first content producing device indicating that the first content producing device can serve content for a routable prefix that corresponds to a received index, configuring a forwarding information base of the client computing device based on the notification message.

* * * * *